(12) United States Patent
Torpey et al.

(10) Patent No.: US 6,167,992 B1
(45) Date of Patent: Jan. 2, 2001

(54) ABRASIVE COATING ON BRAKE PADS

(75) Inventors: Michael Torpey, Royal Oak, MI (US); Lionel Ancheta, Athens; Michael Stonecipher, Colbert, both of GA (US)

(73) Assignee: AlliedSignal Inc., Morristown, NJ (US)

( * ) Notice: Under 35 U.S.C. 154(b), the term of this patent shall be extended for 0 days.

(21) Appl. No.: 09/115,128

(22) Filed: Jul. 14, 1998

(51) Int. Cl.$^7$ .............................. F16D 65/00; F16D 69/00
(52) U.S. Cl. .................. 188/73.1; 188/71.1; 188/251 A; 188/250 G
(58) Field of Search ............................ 188/73.1, 250 G, 188/250 B, 250 E, 250 A, 71.1, 251 M, 251 A, 251 R; 192/107 M; 451/63, 902, 41.5

(56) References Cited

U.S. PATENT DOCUMENTS

| | | |
|---|---|---|
| 3,523,595 | 8/1970 | Massmann . |
| 3,899,050 | 8/1975 | Savary et al. . |
| 3,990,543 * | 11/1976 | Grewette et al. .................. 188/71.1 |
| 4,029,181 * | 6/1977 | Lewis .................. 188/73.1 |
| 4,273,219 * | 6/1981 | Ito .................. 188/251 M |
| 4,315,563 * | 2/1982 | Hayashi et al. .................. 188/73.1 |
| 4,926,978 * | 5/1990 | Shibata et al. .................. 188/251 A |
| 5,474,159 | 12/1995 | Soennecken et al. . |
| 5,482,742 * | 1/1996 | Takamiya et al. .................. 188/251 A |
| 5,788,027 | 8/1998 | Shute et al. . |
| 5,794,740 * | 8/1998 | Velayutha et al. .................. 188/251 A |
| 5,816,901 | 10/1998 | Sirany . |
| 5,971,113 * | 10/1999 | Kesavan et al. .................. 188/251 M |

FOREIGN PATENT DOCUMENTS

| | | | |
|---|---|---|---|
| 2148424 * | 5/1985 | (GB) | .................. 188/73.1 |
| 0004301 * | 1/2000 | (WO) . | |

* cited by examiner

Primary Examiner—Douglas C. Butler

(57) ABSTRACT

An abrasive coating is provided on the friction surface of a braking element, such as, but not limited to a disc brake pad. The abrasive coating is capable of removing a protective coating from a rotor during the initial breaking in period of the brake pad. Additionally, the abrasive coating is capable of polishing away surface irregularities on an improperly resurfaced rotor. The abrasive coating is characterized in that no noise is generated during the establishment of the burnish relationship between the brake pad and the rotor that is attributable to the abrasive coating. The abrasive coating is preferably in the form of two parallel stripes substantially centered on the brake pad away from the leading and trailing edges and extending from one lateral edge to the other lateral edge such that the stripes are substantially perpendicular to the direction of rotation of the rotor.

10 Claims, 3 Drawing Sheets

ABRASIVE COATING ON BRAKE PADS

BACKGROUND OF THE INVENTION

1. Technical Field

This invention relates generally to braking elements and more particularly to an abrasive coating disposed on the surface of a brake pad in a pattern designed to reduce the amount of noise generated during the initial breaking in period of the brake pad with the rotor.

2. Discussion

Brake assemblies in automobiles or other motor vehicles generally include a friction material and a counter-friction material that selectively cooperate with one another to either partially or completely decelerate the automobile. In disc brake systems, the counter-friction material is a rotor; whereas in a drum brake systems, the counter-friction material is a drum.

With respect to disc brake systems, the rotor is generally comprised of cast iron or other metallic material having a surface thereon adapted for contact with a friction material, such as that typically disposed on a surface of a brake pad. The brake pad is usually comprised of a steel or other substrate (i.e., a support surface) having a friction material thereon, wherein the surface of the friction material is adapted for contact with the friction surface of the rotor. When the brake pad is urged up against the rotor, a sufficient amount of friction is generated between the two objects so as to cause the automobile to decelerate, either partially or completely.

The friction material, which is resistant to heat generated by friction during contact with the surface of the rotor, usually comprises a mixture of a cured organic or inorganic binder and a filler material. Natural and synthetic resins and rubber compounds are frequently used as binders, the filler typically consisting of metal chips, metal oxides, asbestos, mineral wool, or other abrading materials dispersed in the binder.

One problem with metal rotors is that they are susceptible to oxidation or corrosion. If the brakes are used often, this problem is not too severe as the friction between the rotor and the brake pad is usually sufficient to remove any thin film of oxidation or corrosion. However, if the brakes are not used for a substantial period of time, such as on a new vehicle kept in a manufacturer's or merchant's lot, the resulting buildup of oxidation or corrosion on the rotor's friction surface can adversely affect the performance of the brake. The corrosion can become so severe that it results in pitting or scarring of the rotor surface, which can render the rotor unsuitable for achieving the desired braking performance. In some instances, the corrosion can cause the rotor to bond to the friction material of the brake pad, which can result in cohesive failure of the friction material or separation of the friction material from its substrate or support surface.

One solution to this problem is to use rotors that have been coated or otherwise surface treated to inhibit corrosion of the rotor. Such treatments include oil or grease or the like; electro deposition coatings such as cathodic electrodeposition of amine-salted epoxy resins curable with isocyanate crosslinkers; other curable coatings such as melamine-cured OH-functional acrylic coatings; thermoplastic coatings such as high-molecular weight acrylic or polyurethane latexes or oil-based alkyd coatings; metal oxide coatings where a thin film of oxidation is allowed to form without pitting; and inorganic coatings such as zinc particles dispersed in a potassium silicate solution.

A problem with treated rotors is that although they are resistant to corrosion, the treated surface often does not provide adequate braking performance, especially when matched with a friction material on the brake pad that is itself designed for use with the underlying metal out of which the rotor is made.

It has been proposed to provide an abrasive coating on the brake pad that would have the effect of removing the protective coating on the rotor during the initial breaking in period of the brakes (e.g., during the first 200 brake applications).

For example, it has been proposed to use a coating of abrasive carborundum particles on the brake pad for this purpose. Such a coating, however, can produce an undesired increase in the new or 'green' friction of the brakes, resulting in unpredictable, noisy, or 'sticky' braking action. Also, with such coatings containing high levels of aggressive abrasive particles, enough particles can embed in the surface of the pad so as to prolong the undesirable performance characteristics.

Another problem arises with rotors that have been resurfaced after being in service for a particular length of time. Occasionally, the resurfacing procedure is improperly executed and results in a rotor surface that is uneven. This uneven rotor surface does not mate well with the brake pad, thus leading to poor braking performance.

Again, it was proposed to provide an abrasive coating on the friction material to remedy any surface irregularities of the rotor after an improper resurfacing procedure. It was thought that the abrasive coating would essentially polish the rotor to remove the surface irregularities therefrom. To accomplish this, an abrasive coating was placed on the entire surface of the friction material of the brake pad. However, this configuration lead to accumulation of the abrasive coating at the trailing edge of the friction material, thus leading to unacceptable levels of noise during braking operations.

Therefore, there is considerable industry interest in the elimination or abatement of noise generated during the initial breaking in period of the brake pad with the rotor; that is, the period leading up to the establishment of a burnish relationship between the brake pad and the rotor. This interest extends to newly manufactured rotors, as well as resurfaced rotors. This noise problem is of special concern to manufacturers and retailers of replacement brake pads. The generation of unacceptable levels of noise generated during the initial braking in period of the brake pad with the rotor will result in consumer dissatisfaction.

Therefore, there exist a need for a brake pad that is capable of removing a corrosion-resistant coating from a rotor during the initial breaking in period of the brake pad with the rotor. Also, there exists a need for a brake pad that is capable of polishing away the surface irregularities of an improperly resurfaced rotor. Additionally, there exists a need for a brake pad that does not generate unacceptable levels of noise during this initial breaking in period with the rotor. Furthermore, there exists a need for a brake pad that maintains good braking performance both during and after this breaking in period with the rotor.

SUMMARY OF THE INVENTION

In accordance with one embodiment of the present invention, a braking element for use with a rotatable counter-friction material comprises a friction surface, the friction surface having first and second spaced apart lateral edges substantially perpendicular to the direction of rotation of the counter-friction material, the friction surface having third and fourth spaced apart lateral edges substantially parallel to the direction of rotation of the counter-friction material, the friction surface having an abrasive coating disposed on at least a portion thereof, wherein at least one of the first and second lateral edges are free of the abrasive coating.

A more complete appreciation of the present invention and its scope can be obtained from understanding the accompanying drawings, which are briefly summarized below, the following detailed description of the invention, and the appended claims.

BRIEF DESCRIPTION OF THE DRAWINGS

The same reference numerals refer to the same parts throughout the various drawings.

DETAILED DESCRIPTION OF THE INVENTION

Figure 1:
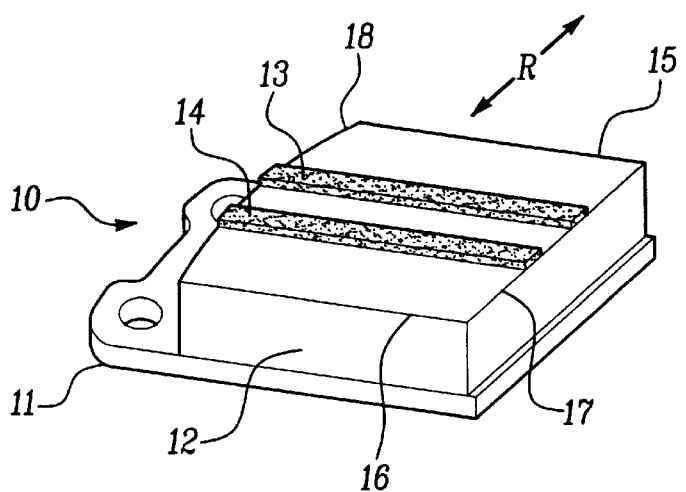
FIG. 1 is a perspective view of a brake pad, in accordance with one embodiment of the present invention.

Although the following description refers primarily to brake pads for use in disc brake assemblies, it will be appreciated by the skilled artisan that the present invention has equal application and utility with respect to friction materials for use in drum brake assemblies.

The brake pad of the present invention comprises a friction material having a surface adapted for contact with a brake rotor, wherein the surface of the friction material contains an abrasive coating or slurry disposed thereon. The abrasive coating is disposed in a certain pattern on the surface of the friction material so as to not cause unacceptable levels of noise during the initial breaking in period of the brake pad with the rotor. Additionally, the abrasive coating is disposed in a certain pattern on the surface of the friction material so as to be capable of polishing away any surface irregularities on an improperly resurfaced rotor.

The friction material can be virtually any type of material that is useful in brake systems, such as semi-metallic friction materials, low-metallic friction materials, asbestos organics, ceramets, and others known in the art.

Friction materials useful in the practice of the present invention generally contain one or more thermosetting resinous binders (e.g., phenolic resins such as phenol-formaldehyde resins, epoxies), reinforcing fibers (e.g., aramid, steel, acrylic, and although no longer widely used, asbestos), metal powders (e.g., iron, copper, brass, zinc, aluminum, antimony, and the like), solid lubricants (e.g., molybdenum disulfide, graphite, coke, stannic sulfide, antimony trisulfide, abrasives (e.g., tin oxide, magnesia, silica, iron oxide, alumina, rutile, and the like), organic fillers (e.g., rubber particles, cashew nut particles, nitrile rubber particles), and inorganic fillers (e.g., barytes, gypsum, mica, titanates, and the like). Other materials and additives may be added as well, as is known in the art.

Any suitable abrasive coating may be used to practice the present invention. In accordance with one aspect of the present invention, the abrasive coating is preferably comprised primarily of an adhesive, such as a nitrile/phenolic water-based adhesive, an abrasive, such as rutile (i.e., $TiO_2$), and a dye, such as nigrosine base. Additionally, a filler, such as barytes, may also be employed. Therefore, the abrasive coating of the present invention can be comprised of components selected from the group consisting of adhesives, abrasives, fillers, dyes, and water. The exact formulation of the abrasive coating is not critical to the operation of the present invention. Rather, it is the pattern in which the abrasive coating is disposed on the surface of the friction material which is critical to the operation of the present invention.

The pattern of disposition of the abrasive coating of the present invention ensures that the initial friction of the pad is optimized, and also greatly reduces the likelihood that a poorly performed brake job (i.e., improperly resurfaced or finished rotor) will cause a no stop complaint by polishing or conditioning the rotor.

Figure 2:
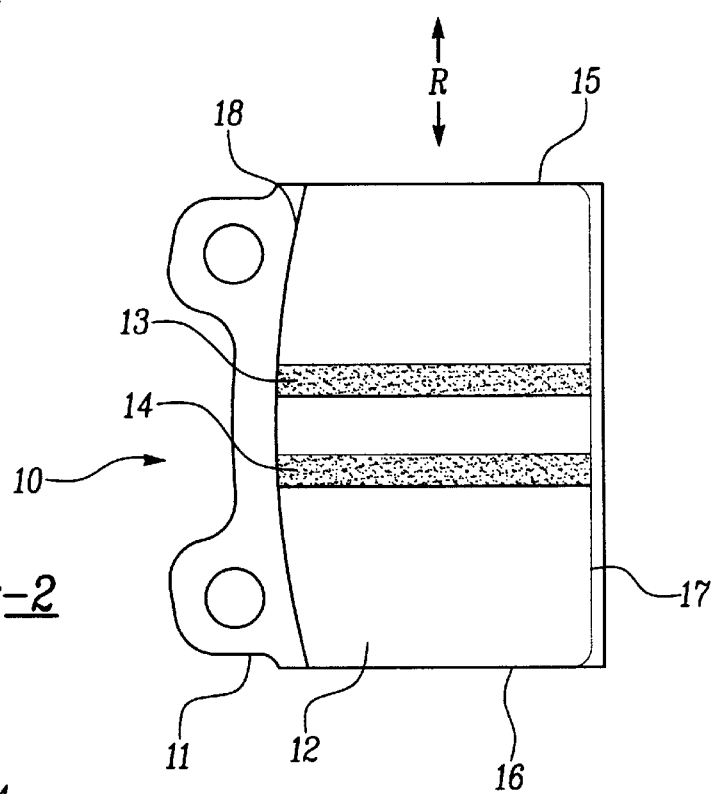
FIG. 2 is a plan view of the brake pad depicted in FIG. 1.
Figure 3:
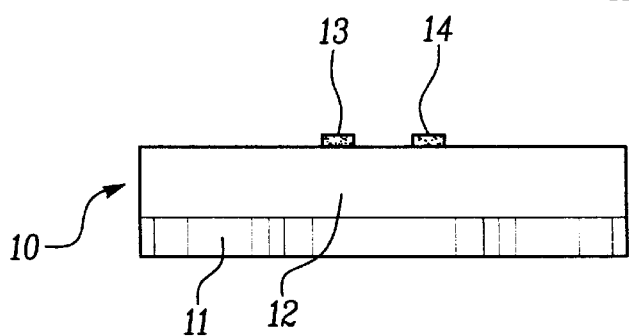
FIG. 3 is an end view of the brake pad depicted in FIG. 2.

Referring to FIGS. 1–3, there is generally illustrated several views of a brake pad 10, in accordance with the preferred embodiment of the present invention. Although the brake pad 10 is shown as being substantially rectangular, other configurations are envisioned, such as, but not limited to circles, squares, and the like. The brake pad 10 consists primarily of a substrate or support surface 11, a friction material 12 disposed on top of the support surface 11, and a pair of vertical elongated stripes 13 and 14 comprised of an abrasive coating disposed on top of the friction material 12. The stripes 13 and 14 are preferably about ⅜ to about ¾ inches wide, and are preferably located about ¾ inches apart and centered on the friction material 12 of the brake pad 10 in order to provide the necessary friction enhancements while not causing any tendency of the abrasive coating comprising the stripes 13 and 14 to produce noise during a braking operation. A symmetrical configuration was chosen because a non-symmetrical configuration would create the need for separate inventory for inner, outer, left, and right brake pads. Additionally, a symmetrical configuration provides stability in the caliper. Without being bound to a particular theory of operation of the present invention, it is believed that the elimination of noise is particularly due to keeping the abrasive coating comprising the stripes 13 and 14 away from the leading and trailing edges, 15 and 16, respectively, of the friction material 12 of the brake pad 10, with this being especially true for the trailing edge 16 of the brake pad 10. It is important to note that the stripes 13 and 14 are disposed on the friction material 12 so as to be substantially perpendicular to the direction of rotation R of the rotor. Additionally, it is important to note that the stripes 13 and 14 extend from edge 17 to edge 18, with edges 17 and 18 being substantially parallel to the direction of rotation R of the rotor.

Figure 4:
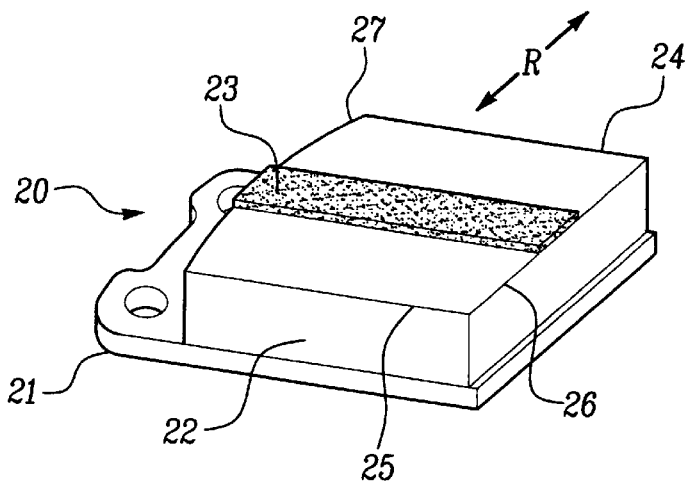
FIG. 4 is a perspective view of a brake pad, in accordance with a first alternative embodiment of the present invention.
Figure 5:
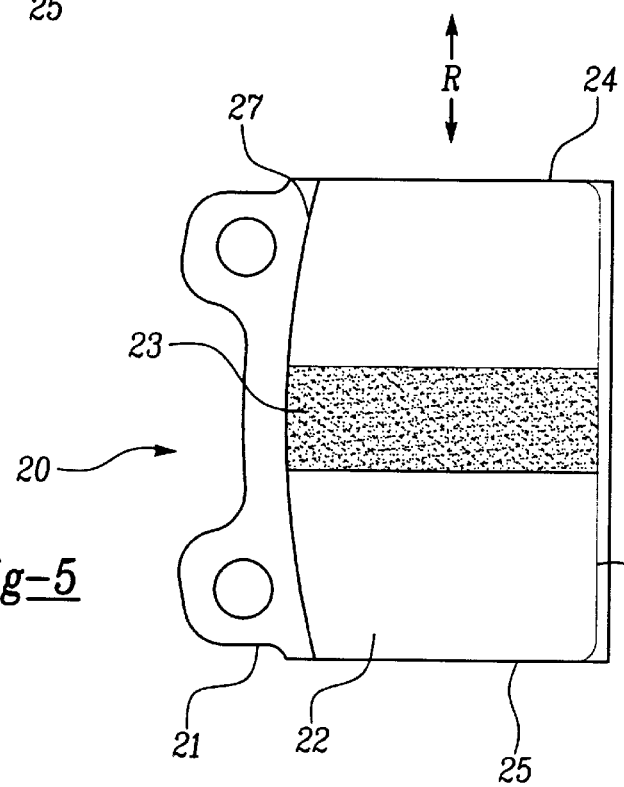
FIG. 5 is a plan view of the brake pad depicted in FIG. 4.
Figure 6:
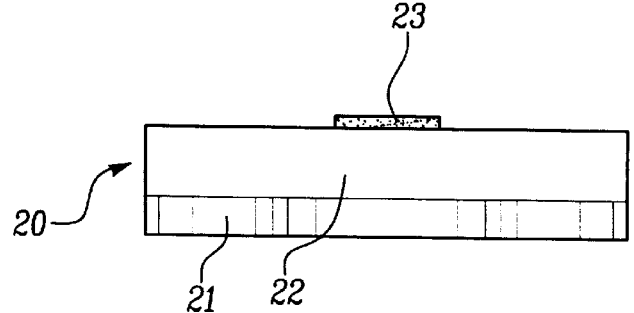
FIG. 6 is an end view of the brake pad depicted in FIG. 5.

Referring to FIGS. 4–6, there is generally illustrated several views of a brake pad 20, in accordance with a first alternative embodiment of the present invention. Again, the brake pad 20 consists primarily of a substrate or support surface 21 and a friction material 22 disposed on top of the support surface 21. However, instead of employing two stripes of an abrasive coating, a single vertical elongated stripe 23 is centrally located on the surface of the friction material 22 of the brake pad 20. The stripe 23 is preferably about ¾ to about 1½ inches wide. As with the preferred embodiment, this particular pattern provides the necessary friction enhancements while not causing any tendency of the abrasive coating comprising the stripe 23 to produce noise during a braking operation. Without being bound to a particular theory of operation of the present invention, it is believed that the elimination of noise is particularly due to keeping the abrasive coating comprising the stripe 23 away from the leading and trailing edges, 24 and 25, respectively, of the friction material 22 of the brake pad 20, with this being especially true for the trailing edge 25 of the brake pad 20. It is important to note that the stripe 23 is disposed on the friction material 22 so as to be substantially perpendicular to the direction of rotation R of the rotor. Additionally, it is important to note that the stripe 23 extends from edge 26 to edge 27, with edges 26 and 27 being substantially parallel to the direction of rotation R of the rotor.

Figure 7:
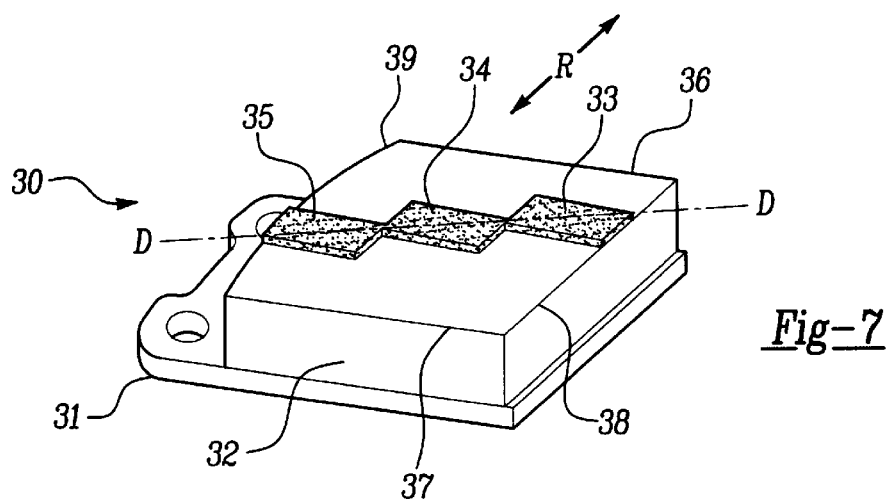
FIG. 7 is a perspective view of a brake pad, in accordance with a second alternative embodiment of the present invention.
Figure 8:
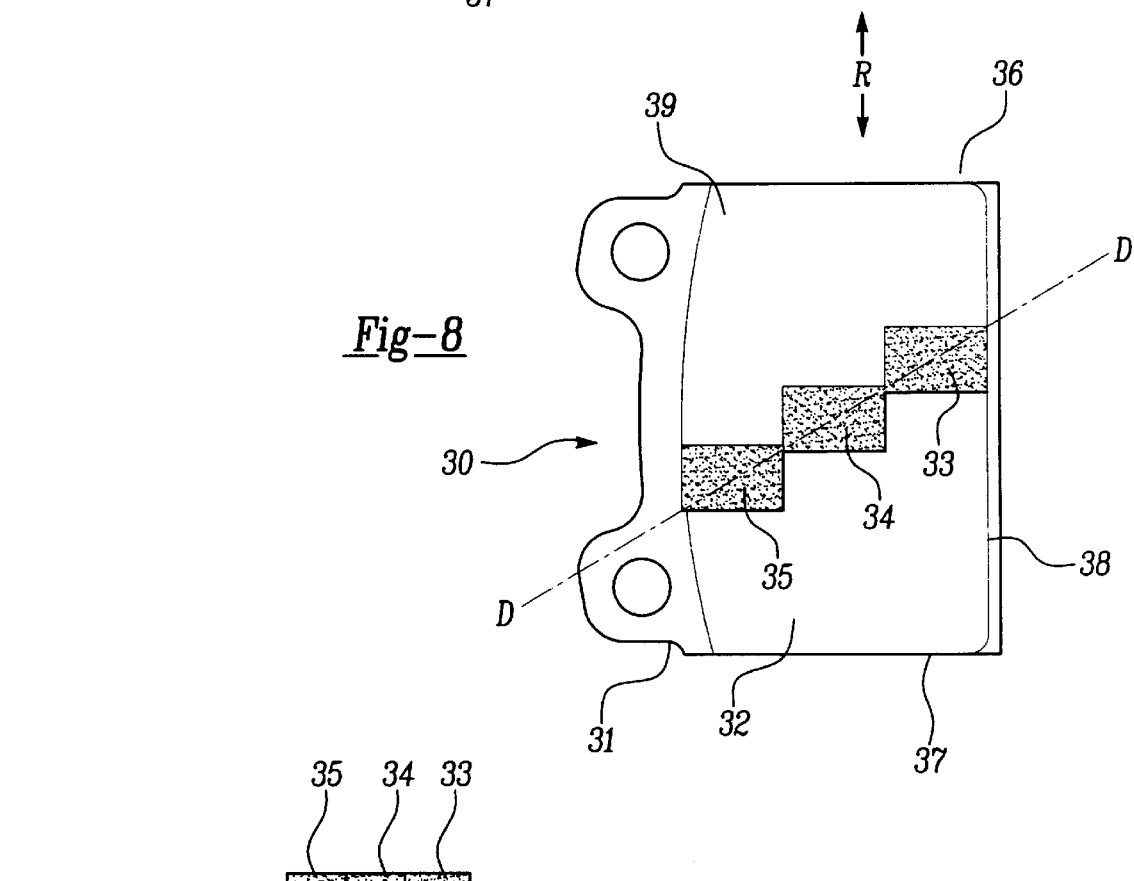
FIG. 8 is a plan view of the brake pad depicted in FIG. 7.
Figure 9:
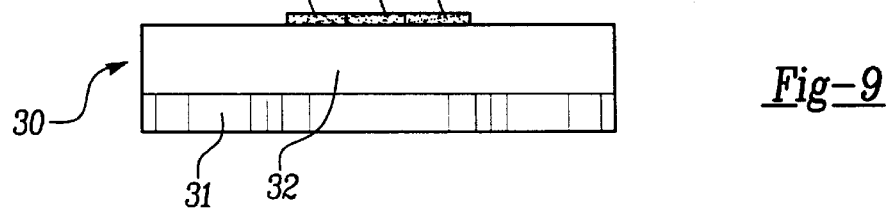
FIG. 9 is an end view of the brake pad depicted in FIG. 8.

Referring to FIGS. 7–9, there is illustrated several views of a brake pad 30, in accordance with a second alternative embodiment of the present invention. Again, the brake pad 30 consists primarily of a substrate or support surface 31 and a friction material 32 disposed on top of the support surface 31. However, instead of employing one or two stripes of an abrasive coating, a series of vertically elongated stripes 33, 34, and 35, are centrally located on the surface of the friction material 32 of the brake pad 30. Although three stripes are shown, it will be appreciated by the skilled artisan that either less than or more than three stripes can be employed to practice the present invention. The stripes 33, 34, and 35 are preferably about ⅜ to about ¾ inches wide. In this embodiment, the stripes 33, 34, and 35 are preferably aligned in a diagonal pattern so as to ensure that substantially no portion of the surface of the friction material 32 along imaginary diagonal line D is not covered with the abrasive coating comprising stripes 33, 34, and 35. As with the previously described embodiments, this particular pattern provides the necessary friction enhancements while not causing any tendency of the abrasive coating comprising stripes 33, 34, and 35 to produce noise during a braking operation. Without being bound to a particular theory of operation of the present invention, it is believed that the elimination of noise is particularly due to keeping the abrasive coating comprising the stripes 33, 34, and 35 away from the leading and trailing edges, 36 and 37, respectively, of the friction material 32 of the brake pad 30, with this being especially true for the trailing edge 37 of the brake pad 30. It is important to note that the stripes 33, 34, and 35 are disposed on the friction material 32 so as to be substantially perpendicular to the direction of rotation R of the rotor. Additionally, it is important to note that the stripes 33, 34, and 35 extend from edge 38 to edge 39, with edges 38 and 39 being substantially parallel to the direction of rotation R of the rotor.

With respect to the process employed to dispose the abrasive coating upon the surface of the friction material, the abrasive coating can be applied by a silk screen process. Alternatively, the abrasive coating can also be applied by any other suitable processes such as, but not limited to, roll coating. Once the abrasive coating has been applied in the desired pattern to the surface of the friction material, the abrasive coating is then dried and cured in a either a short wavelength or combination short wavelength and long wavelength infrared (IR) belt oven. Parts that have been coated are otherwise handled via the standard plant production processes.

With respect to the thickness of the abrasive coating, it will be dependent in part on several factors, including the chemical composition of the abrasive coating, the materials comprising the rotor and the brake pad, and the operating conditions of the brake assembly. However, in a preferred embodiment, the thickness of the abrasive coating is in the range of about 0.003 to about 0.018 inches.

In order to compare the relative amount of noise generated by a brake pad prepared in accordance with the general teachings of the present invention versus a brake pad having an abrasive coating on the leading and trailing edges, several diagnostic tests were conducted. These tests were conducted at the pre-burnish stage, post-burnish stage, and at the fade stage. The most significant of these tests is the pre-burnish stage, because the present invention is primarily concerned with eliminating noise generated at this stage when the brake pad is being broken in with the rotor. With respect to methodology, the amount of noise generated during a braking operation was subjectively assigned a number from 1–10 by the driver of the automobile, with 10 representing no noise and 1 representing a high level of noise. The noise data was recorded at the beginning of the stop ("bos"), the first half of the stop ("tos"), the second half of the stop ("sos"), and the end of the stop ("eos") for a variety of deceleration levels and brake temperature conditions. It should be noted that the same types of brake pads and abrasive coating were used for both sets of tests; the only difference was the pattern of the abrasive coating on the surface of the brake pad. The noise data generated by a brake pad having an abrasive coating disposed on the leading and trailing edges of the brake pad is presented in Tables 1–3, below:

TABLE 1

Pre-Burnish Stage

| Temperature Condition | Deceleration Level .2G (6.4 ft/s$^2$) | | | | Deceleration Level .3G (9.7 ft/s$^2$) | | | | Deceleration Level .4G (13 ft/s$^2$) | | | | Deceleration Level .6G (19 ft/s$^2$) | | | | Deceleration Level .8G (25 ft/s$^2$) | | | |
|---|---|---|---|---|---|---|---|---|---|---|---|---|---|---|---|---|---|---|---|---|
| 140° F. Heating | 10 | 10 | 10 | 10 | 10 | 10 | 10 | 10 | 10 | 10 | 6 | 7 | 10 | 10 | 6 | 7 | 10 | 10 | 10 | 10 |
| 200° F. Heating | 10 | 10 | 10 | 6 | 10 | 10 | 10 | 9 | 10 | 10 | 7 | 6 | 10 | 10 | 7 | 5 | 10 | 10 | 10 | 10 |
| 250° F. Heating | 10 | 10 | 10 | 10 | 10 | 10 | 10 | 8 | 10 | 10 | 10 | 9 | 10 | 10 | 7 | 7 | 10 | 10 | 10 | 10 |
| 300° F. Heating | 10 | 10 | 10 | 10 | 10 | 10 | 10 | 10 | 10 | 10 | 10 | 10 | 10 | 10 | 10 | 5 | 10 | 10 | 10 | 10 |
| 350° F. Heating | 10 | 10 | 10 | 10 | 10 | 10 | 10 | 10 | 10 | 10 | 10 | 10 | 10 | 10 | 10 | 10 | 10 | 10 | 10 | 10 |
| 300° F. Cooling | 10 | 10 | 10 | 10 | 10 | 10 | 10 | 9 | 10 | 10 | 10 | 9 | 10 | 10 | 10 | 9 | 10 | 10 | 10 | 10 |
| 250° F. Cooling | 10 | 10 | 10 | 10 | 10 | 10 | 10 | 10 | 10 | 10 | 10 | 9 | 10 | 10 | 10 | 10 | 10 | 10 | 10 | 10 |
| 200° F. Cooling | 10 | 10 | 10 | 10 | 10 | 10 | 10 | 10 | 10 | 10 | 10 | 10 | 10 | 10 | 10 | 9 | 10 | 10 | 10 | 10 |
| 140° F. Cooling | 10 | 10 | 10 | 10 | 10 | 10 | 10 | 9 | 10 | 10 | 10 | 9 | 10 | 10 | 10 | 10 | 10 | 10 | 10 | 10 |
| | bos | tos | sos | eos | bos | tos | sos | eos | bos | tos | sos | eos | bos | tos | sos | eos | bos | tos | sos | eos |

TABLE 2

Post-Burnish Stage

| Temperature Condition | Deceleration Level .2G (6.4 ft/s²) | | | | Deceleration Level .3G (9.7 ft/s²) | | | | Deceleration Level .4G (13 ft/s²) | | | | Deceleration Level .6G (19 ft/s²) | | | | Deceleration Level .8G (25 ft/s²) | | | |
|---|---|---|---|---|---|---|---|---|---|---|---|---|---|---|---|---|---|---|---|---|
| 140° F. Heating | 10 | 10 | 10 | 10 | 10 | 10 | 10 | 10 | 10 | 10 | 10 | 10 | 10 | 10 | 10 | 10 | 10 | 10 | 10 | 10 |
| 200° F. Heating | 10 | 10 | 10 | 6 | 10 | 10 | 10 | 10 | 10 | 10 | 10 | 10 | 10 | 10 | 10 | 10 | 10 | 10 | 10 | 10 |
| 250° F. Heating | 10 | 10 | 10 | 10 | 10 | 10 | 10 | 10 | 10 | 10 | 10 | 10 | 10 | 10 | 10 | 10 | 10 | 10 | 10 | 10 |
| 300° F. Heating | 10 | 10 | 10 | 10 | 10 | 10 | 10 | 10 | 10 | 10 | 10 | 10 | 10 | 10 | 10 | 10 | 10 | 10 | 10 | 10 |
| 350° F. Heating | 10 | 10 | 10 | 10 | 10 | 10 | 10 | 10 | 10 | 10 | 10 | 10 | 10 | 10 | 10 | 10 | 10 | 10 | 10 | 10 |
| 300° F. Cooling | 10 | 10 | 9 | 8 | 10 | 10 | 6 | 10 | 10 | 10 | 10 | 10 | 10 | 10 | 10 | 10 | 10 | 10 | 10 | 10 |
| 250° F. Cooling | 10 | 10 | 10 | 9 | 10 | 10 | 10 | 10 | 10 | 10 | 10 | 10 | 10 | 10 | 10 | 10 | 10 | 10 | 10 | 10 |
| 200° F. Cooling | 10 | 10 | 10 | 10 | 10 | 10 | 10 | 10 | 10 | 10 | 10 | 10 | 10 | 10 | 10 | 10 | 10 | 10 | 10 | 10 |
| 140° F. Cooling | 10 | 10 | 10 | 10 | 10 | 10 | 10 | 10 | 10 | 10 | 10 | 10 | 10 | 10 | 10 | 10 | 10 | 10 | 10 | 10 |
| | bos | tos | sos | eos | bos | tos | sos | eos | bos | tos | sos | eos | bos | tos | sos | eos | bos | tos | sos | eos |

TABLE 3

Fade Stage

| Temperature Condition | Deceleration Level .2G (6.4 ft/s²) | | | | Deceleration Level .3G (9.7 ft/s²) | | | | Deceleration Level .4G (13 ft/s²) | | | | Deceleration Level .6G (19 ft/s²) | | | | Deceleration Level .8G (25 ft/s²) | | | |
|---|---|---|---|---|---|---|---|---|---|---|---|---|---|---|---|---|---|---|---|---|
| 140° F. Heating | 10 | 10 | 10 | 10 | 10 | 10 | 4 | 3 | 10 | 10 | 10 | 10 | 10 | 10 | 10 | 10 | 10 | 10 | 10 | 10 |
| 200° F. Heating | 10 | 10 | 10 | 10 | 10 | 10 | 10 | 10 | 10 | 10 | 10 | 10 | 10 | 10 | 10 | 10 | 10 | 10 | 10 | 10 |
| 250° F. Heating | 10 | 10 | 10 | 5 | 10 | 10 | 10 | 10 | 10 | 10 | 10 | 10 | 10 | 10 | 10 | 10 | 10 | 10 | 10 | 10 |
| 300° F. Heating | 10 | 10 | 10 | 10 | 10 | 10 | 10 | 10 | 10 | 10 | 10 | 10 | 10 | 10 | 10 | 10 | 10 | 10 | 10 | 10 |
| 350° F. Heating | 10 | 10 | 10 | 10 | 10 | 10 | 10 | 10 | 10 | 10 | 10 | 10 | 10 | 10 | 10 | 10 | 10 | 10 | 10 | 10 |
| 300° F. Cooling | 10 | 10 | 10 | 10 | 10 | 10 | 10 | 10 | 10 | 10 | 10 | 10 | 10 | 10 | 10 | 10 | 10 | 10 | 10 | 10 |
| 250° F. Cooling | 10 | 10 | 10 | 10 | 10 | 10 | 10 | 10 | 10 | 10 | 10 | 10 | 10 | 10 | 10 | 10 | 10 | 10 | 10 | 10 |
| 200° F. Cooling | 10 | 10 | 10 | 10 | 10 | 10 | 10 | 10 | 10 | 10 | 10 | 10 | 10 | 10 | 10 | 10 | 10 | 10 | 10 | 10 |
| 140° F. Cooling | 10 | 10 | 10 | 9 | 10 | 10 | 10 | 10 | 10 | 10 | 10 | 10 | 10 | 10 | 10 | 10 | 10 | 10 | 10 | 10 |
| | bos | tos | sos | eos | bos | tos | sos | eos | bos | tos | sos | eos | bos | tos | sos | eos | bos | tos | sos | eos |

The noise data generated by a brake pad prepared in accordance with the present invention, specifically two vertical stripes of abrasive coating centered on the brake pad (see FIGS. 1–3), is presented in Tables 4–6, below:

TABLE 4

Pre-Burnish Stage

| Temperature Condition | Deceleration Level .2G (6.4 ft/s²) | | | | Deceleration Level .3G (9.7 ft/s²) | | | | Deceleration Level .4G (13 ft/s²) | | | | Deceleration Level .6G (19 ft/s²) | | | | Deceleration Level .8G (25 ft/s²) | | | |
|---|---|---|---|---|---|---|---|---|---|---|---|---|---|---|---|---|---|---|---|---|
| 140° F. Heating | 10 | 10 | 10 | 10 | 10 | 10 | 10 | 10 | 10 | 10 | 10 | 10 | 10 | 10 | 10 | 10 | 10 | 10 | 10 | 10 |
| 200° F. Heating | 10 | 10 | 10 | 10 | 10 | 10 | 10 | 10 | 10 | 10 | 10 | 10 | 10 | 10 | 10 | 10 | 10 | 10 | 10 | 10 |
| 250° F. Heating | 10 | 10 | 10 | 10 | 10 | 10 | 10 | 10 | 10 | 10 | 10 | 10 | 10 | 10 | 10 | 10 | 10 | 10 | 10 | 10 |
| 300° F. Heating | 10 | 10 | 10 | 10 | 10 | 10 | 10 | 10 | 10 | 10 | 10 | 10 | 10 | 10 | 10 | 10 | 10 | 10 | 10 | 10 |
| 350° F. Heating | 10 | 10 | 10 | 10 | 10 | 10 | 10 | 10 | 10 | 10 | 10 | 10 | 10 | 10 | 10 | 10 | 10 | 10 | 10 | 10 |
| 300° F. Cooling | 10 | 10 | 10 | 10 | 10 | 10 | 10 | 10 | 10 | 10 | 10 | 10 | 10 | 10 | 10 | 10 | 10 | 10 | 10 | 10 |
| 250° F. Cooling | 10 | 10 | 10 | 10 | 10 | 10 | 10 | 10 | 10 | 10 | 10 | 10 | 10 | 10 | 10 | 10 | 10 | 10 | 10 | 10 |
| 200° F. Cooling | 10 | 10 | 10 | 10 | 10 | 10 | 10 | 10 | 10 | 10 | 10 | 10 | 10 | 10 | 10 | 10 | 10 | 10 | 10 | 10 |
| 140° F. Cooling | 10 | 10 | 10 | 10 | 10 | 10 | 10 | 10 | 10 | 10 | 10 | 10 | 10 | 10 | 10 | 10 | 10 | 10 | 10 | 10 |
| | bos | tos | sos | eos | bos | tos | sos | eos | bos | tos | sos | eos | bos | tos | sos | eos | bos | tos | sos | eos |

TABLE 5

Post-Burnish Stage

| Temperature Condition | Deceleration Level .2G (6.4 ft/s$^2$) | | | | Deceleration Level .3G (9.7 ft/s$^2$) | | | | Deceleration Level .4G (13 ft/s$^2$) | | | | Deceleration Level .6G (19 ft/s$^2$) | | | | Deceleration Level .8G (25 ft/s$^2$) | | | |
|---|---|---|---|---|---|---|---|---|---|---|---|---|---|---|---|---|---|---|---|---|
| 140° F. Heating | 10 | 10 | 10 | 10 | 10 | 10 | 10 | 10 | 10 | 10 | 10 | 10 | 10 | 10 | 10 | 10 | 10 | 10 | 10 | 10 |
| 200° F. Heating | 10 | 10 | 10 | 10 | 10 | 10 | 10 | 10 | 10 | 10 | 10 | 10 | 10 | 10 | 10 | 10 | 10 | 10 | 10 | 10 |
| 250° F. Heating | 10 | 10 | 10 | 10 | 10 | 10 | 10 | 10 | 10 | 10 | 10 | 10 | 10 | 10 | 10 | 10 | 10 | 10 | 10 | 10 |
| 300° F. Heating | 10 | 10 | 10 | 10 | 10 | 10 | 10 | 10 | 10 | 10 | 10 | 10 | 10 | 10 | 10 | 10 | 10 | 10 | 10 | 10 |
| 350° F. Heating | 10 | 10 | 10 | 10 | 10 | 10 | 10 | 10 | 10 | 10 | 10 | 10 | 10 | 10 | 10 | 10 | 10 | 10 | 10 | 10 |
| 300° F. Cooling | 10 | 10 | 10 | 10 | 10 | 10 | 10 | 10 | 10 | 10 | 10 | 10 | 10 | 10 | 10 | 10 | 10 | 10 | 10 | 10 |
| 250° F. Cooling | 10 | 10 | 10 | 10 | 10 | 10 | 10 | 9 | 10 | 10 | 10 | 9 | 10 | 10 | 10 | 10 | 10 | 10 | 10 | 10 |
| 200° F. Cooling | 10 | 10 | 10 | 10 | 10 | 10 | 10 | 9 | 10 | 10 | 10 | 9 | 10 | 10 | 10 | 10 | 10 | 10 | 10 | 10 |
| 140° F. Cooling | 10 | 10 | 10 | 10 | 10 | 10 | 10 | 9 | 10 | 10 | 10 | 10 | 10 | 10 | 10 | 10 | 10 | 10 | 10 | 10 |
| | bos | tos | sos | eos | bos | tos | sos | eos | bos | tos | sos | eos | bos | tos | sos | eos | bos | tos | sos | eos |

TABLE 6

Fade Stage

| Temperature Condition | Deceleration Level .2G (6.4 ft/s$^2$) | | | | Deceleration Level .3G (9.7 ft/s$^2$) | | | | Deceleration Level .4G (13 ft/s$^2$) | | | | Deceleration Level .6G (19 ft/s$^2$) | | | | Deceleration Level .8G (25 ft/s$^2$) | | | |
|---|---|---|---|---|---|---|---|---|---|---|---|---|---|---|---|---|---|---|---|---|
| 140° F. Heating | 10 | 10 | 10 | 10 | 10 | 10 | 10 | 10 | 10 | 10 | 10 | 10 | 10 | 10 | 10 | 10 | 10 | 10 | 10 | 10 |
| 200° F. Heating | 10 | 10 | 10 | 10 | 10 | 10 | 10 | 10 | 10 | 10 | 10 | 10 | 10 | 10 | 10 | 10 | 10 | 10 | 10 | 10 |
| 250° F. Heating | 10 | 10 | 10 | 10 | 10 | 10 | 10 | 10 | 10 | 10 | 10 | 10 | 10 | 10 | 10 | 10 | 10 | 10 | 10 | 10 |
| 300° F. Heating | 10 | 10 | 10 | 9 | 10 | 10 | 10 | 10 | 10 | 10 | 10 | 10 | 10 | 10 | 10 | 10 | 10 | 10 | 10 | 10 |
| 350° F. Heating | 10 | 10 | 10 | 10 | 10 | 10 | 10 | 10 | 10 | 10 | 10 | 10 | 10 | 10 | 10 | 10 | 10 | 10 | 10 | 10 |
| 300° F. Cooling | 10 | 10 | 10 | 10 | 10 | 10 | 10 | 10 | 10 | 10 | 10 | 10 | 10 | 10 | 10 | 10 | 10 | 10 | 10 | 10 |
| 250° F. Cooling | 10 | 10 | 10 | 10 | 10 | 10 | 10 | 10 | 10 | 10 | 10 | 10 | 10 | 10 | 10 | 10 | 10 | 10 | 10 | 10 |
| 200° F. Coohng | 10 | 10 | 10 | 10 | 10 | 10 | 10 | 10 | 10 | 10 | 10 | 10 | 10 | 10 | 10 | 10 | 10 | 10 | 10 | 10 |
| 140° F. Cooling | 10 | 10 | 10 | 10 | 10 | 10 | 10 | 10 | 10 | 10 | 10 | 10 | 10 | 10 | 10 | 10 | 10 | 10 | 10 | 10 |
| | bos | tos | sos | eos | bos | tos | sos | eos | bos | tos | sos | eos | bos | tos | sos | eos | bos | tos | sos | eos |

Thus, the foregoing data illustrates that a brake pad prepared in accordance with the present invention does not generate any noise during the pre-burnish stage that is attributable to the abrasive coating; generates hardly any noise during the post-burnish stage that is attributable to the abrasive coating; and generates virtually no noise during the fade stage that is attributable to the abrasive coating. Conversely, the brake pad having an abrasive coating on the leading and trailing edges, generated excessive amounts of noise during the pre-burnish stage.

Preferably, the abrasive coating of the present invention will last about 20 to about 50 stops. Without being bound to a particular theory of the operation of the present invention, it is believed that an acceptable burnish relationship between the brake pad and the rotor will be established within this period.

The foregoing description is considered illustrative only of the principles of the invention. Furthermore, because numerous modifications and changes will readily occur to those skilled in the art, it is not desired to limit the invention to the exact construction and process shown as described above. Accordingly, all suitable modifications and equivalents that may be resorted to that fall within the scope of the invention as defined by the claims that follow.

What is claimed is:

1. A disc brake pad for use with a brake rotor, the disc brake pad having a friction surface, the friction surface having first and second spaced apart lateral edges substantially perpendicular to the direction of rotation of the rotor, the friction surface having third and fourth spaced apart lateral edges substantially parallel to the direction of rotation of the rotor, the friction surface having an abrasive surface coating disposed on at least a portion thereof, said surface coating being removable by brake application during the first 200 brake applications to which the disc brake pad is subjected, wherein at least one of the first and second lateral edges of the friction surface are free of the abrasive coating.

2. The disc brake pad of claim 1, wherein the abrasive coating is capable of abrading away any surface irregularities of the rotor.

3. The disc brake pad of claim 1, wherein the abrasive coating extends from the third lateral edge to the fourth lateral edge.

4. The disc brake pad of claim 1, wherein the abrasive coating does not generate noise when in the process of establishing a burnish relationship with the rotor.

5. The disc brake pad of claim 1, wherein both the first and second lateral edges are free of the abrasive coating.

6. The disc brake pad of claim 1, wherein the abrasive coating is disposed in a substantially centrally located portion of the friction surface.

7. The disc brake pad of claim 1, wherein the abrasive coating in disposed on the friction surface in the form of at least one elongated stripe, wherein the stripe is substantially perpendicular to the direction of rotation of the rotor.

8. The disc brake pad of claim 7, wherein the abrasive coating extends from the third lateral edge to the fourth lateral edge.

9. The disc brake pad of claim 7, wherein there are two stripes disposed on the friction surface.

10. The disc brake pad of claim 1, wherein the abrasive coating is comprised of components selected from the group consisting of adhesives, abrasives, fillers, dyes, water, and mixtures thereof.

* * * * *